Feb. 21, 1967   R. G. HANLON   3,305,196
VEHICULAR STRUCTURES MADE FROM FOAMED PLASTIC MATERIALS
Filed Nov. 4, 1964
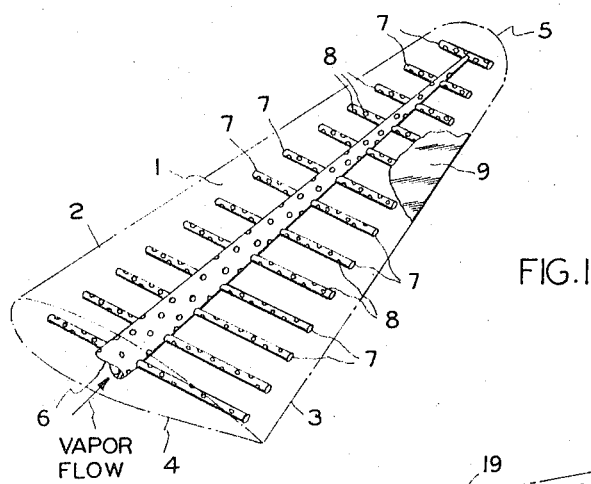
FIG.1
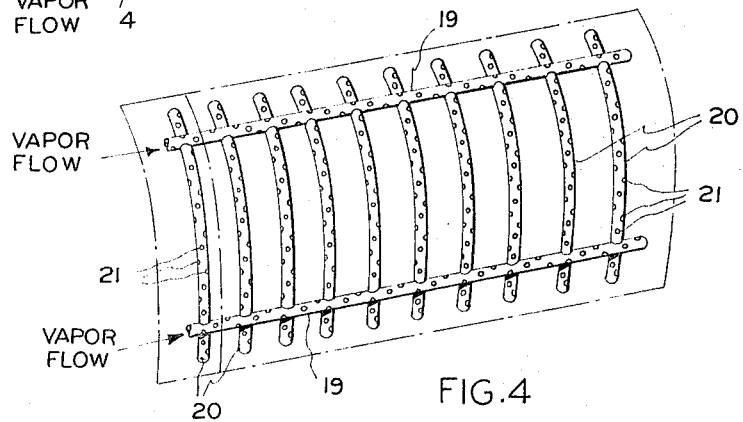
FIG.4
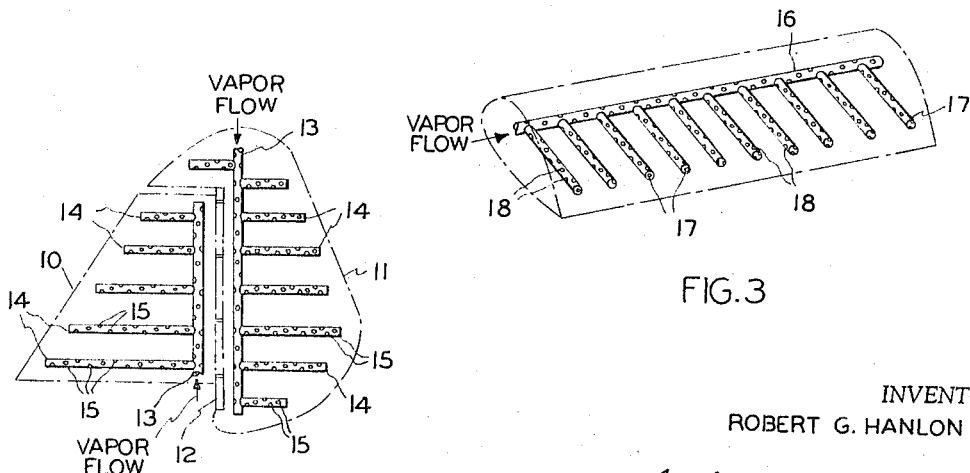
FIG.3
FIG.2
INVENTOR
ROBERT G. HANLON
BY *Plumley, Tyner & Sandt*
*Jerome Budy*
ATTORNEYS United States Patent Office 3,305,196
Patented Feb. 21, 1967

3,305,196
VEHICULAR STRUCTURES MADE FROM
FOAMED PLASTIC MATERIALS
Robert G. Hanlon, Midland, Mich., assignor to The Dow
Chemical Company, Midland, Mich., a corporation of
Delaware
Filed Nov. 4, 1964, Ser. No. 408,963
3 Claims. (Cl. 244—123)

This invention relates to the preparation of vehicular structures utilizing foamed plastic materials, and more particularly, it relates to the manufacture of aircraft structures from foamed polymeric styrene.

Many synthetic plastic materials can be foamed by incorporating a blowing agent into the plastic. Expansion of the plastic into a multicellular material many times larger than its original volume may then be accomplished by the application of heat permitting the blowing agent to become activated and to form a cellular structure within the softened plastic.

Because of the combined properties of being light in weight and having a cellular structure providing dead air space, foamed plastic materials have found wide use as thermal insulating materials. Although these properties suggest the use of such materials for construction panels in the fabrication of walls of buildings or the like, they lack the strength and load bearing characteristics necessary for wide acceptance, and are usually limited to applications where the load bearing is light, e.g., curtain walls. Furthermore, in the process of foaming certain plastics in situ between outer skins of a sandwich construction, it has been difficult to provide uniform foaming throughout the large size of building panels. As a result, most of such panels are produced by making expanded foam slabs and subsequently adhering skins to those slabs.

It has now been found that foamed plastic materials may be advantageously employed in the construction of an aircraft wing or other structural sections of an airplane or other airborne vehicle. It is an object of this invention to provide a novel vehicular structure. It is another object of this invention to provide a novel structure for an airfoil. It is another object of this invention to provide a method for fabricating an aircraft wing or similar structure from a foamed plastic material. It is still another object of this invention to provide a reinforced foamed polystyrene structure for use in fabricating airfoils. Other objects will appear from the more detailed description of this invention which follows.

The foregoing objects are accomplished in accordance with this invention by providing a load bearing structural section for an aircraft or air vehicle comprising a lightweight, hollow, tubular skeleton, substantially every member of which is pierced with a larger number of small orifices in a multidirectional pattern over the surface of the structure; filling the space between the skeleton and a smooth outer skin, which provides the form for the structural section, with a cellular, rigid plastic foam which is bonded to the skeleton and to the skin. This structure may be formed by employing a large mold having the form of the structural section, placing within the mold the hollow skeleton described above, covering the internal surfaces of the mold with a smooth skin of metal or plastic and filling the space in the mold between the skin and the skeleton with a plastic material which is capable of being foamed by the application of heat and of attaching itself, with or without the assistance of an added adhesive, to the skin covering the surfaces of the mold. With the mold closed, a heated vapor, such as steam, is blown through the hollow interior of the skeleton and thence dispersed through the small orifices uniformly into all the space occupied by the expandable plastic material. The mold is maintained in a closed position until the foam has formed and solidified into a rigid structure. Cooling may be accomplished by conventional water circulation or spray cooling techniques.

A more complete understanding of the working of this invention can be had by reference to the simplified drawings which are attached hereto, indicating various applications of this invention in the construction of airplane sections. FIGURE 1 is an illustration of an airplane wing. FIGURE 2 is an illustration of a vertical tail section of an airplane. FIGURE 3 is an illustration of an aileron for an airplane wing. FIGURE 4 is an illustration of a section of a fuselage of an airplane or a construction panel for any other vehicle.

With particular reference to FIGURE 1, an airplane wing 1 is illustrated generally as having a leading edge 2, a trailing edge 3, an inboard section 4, and a wing tip 5. In the interior portion of the wing there is a skeleton made up of a series of hollow, tubular members which might, for example, be made up of structural aircraft tubing or other extruded, hollow shapes. The skeleton, in simplified form, is shown as being made up of a large, central tapering tube 6, which serves as the main load supporting spar, and lateral tubular members 7 projecting outwardly substantially at right angles from tube 6 and lying substantially in a plane. Some of the members 7 project in a direction towards the leading edge 2 while others project in the opposite direction towards the trailing edge 3. Each of the members 7 is pierced with a multiplicity of orifices 8 which are small and spaced in such a manner as to point in all directions from each member so as to provide uniform dispersion of the heating medium. The skeleton, consisting of tube 6 and members 7 forms the load-supporting structure for the wing. All of the space between the skeleton and the outer surface of the wing is filled with a rigid plastic foam. The outer surface 9 is a smooth, continuous, imperforate skin. The resulting assembly has the capability of producing an extremely strong, lightweight structure.

In FIGURE 2 there is illustrated a vertical tail section, or stabilizer, of an airplane with a stationary portion 10 and a movable portion 11 joined by a hinge connection 12. In each portion there is a principal skeleton member 13 to which are joined a multiplicity of branch skeleton members 14. Orifices 15 are placed in each of members 13 and 14 to provide for a uniform distribution of the steam or other hot vapors employed to cause foaming of the plastic as described previously.

In FIGURE 3 there is illustrated an aileron or other relatively small airfoil. A principal skeleton member 16 has branch skeleton members 17 and orifices 18 all designed to conduct steam or other vapor into all sections of the airfoil.

In FIGURE 4 there is illustrated a panel structure which might be employed as a portion of the body of any vehicle, e.g. the fuselage of an airplane or the door of a vehicle. The load-supporting skeleton is made up of principal members 19 and branch members 20 all of which are pierce with a multiplicity or orifices 21 for the same purpose of conducting and distributing steam or hot vapors as described previously.

In the process of manufacturing an airfoil as described in this invention, the central load-supporting skeleton is designed so as to accommodate and to provide the major support for the structure. This skeleton is placed in the cavity of a mold in the same fashion that a core might be placed in a mold. The open space between the skeleton and the mold surface is then filled with a plastic material containing a blowing agent. This plastic material may or may not be partially foamed before it is introduced into the mold, but in any event the foaming is completed in the mold by the application of heat. The two halves of the mold are clamped in the closed position and a hot vapor, such as steam, is blown into the interior of the skeleton and through the small orifices in the skeleton, simultaneously heating all of the plastic material. Arrows in the attached drawings show the place where the vapor may be introduced into the skeleton. After sufficient heat has been introduced to complete the foaming and fusing action, the plastic is permitted to cool to a rigid, cellular form. A smooth, imperforate outer skin will form if the plastic material is a film-forming substance. If such is not the case, a smooth, tough, imperforate skin may be obtained by covering the surface of the mold, prior to the time the skeleton is placed therein, with a preformed skin which will permanently adhere to the foamed plastic material through the use of suitable heat-activated adhesives, or by reason of the inherent properties of the foam.

The load-supporting skeleton is preferably made of a strong, lightweight metal such as steel, aluminum, or magnesium, although other suitable materials will be apparent to those skilled in the design of aircraft structures.

The materials which can be used for the foamed plastic include many of the thermoplastic and thermosetting materials, e.g., urea-formaldehyde resins, phenol-formaldehyde resins, polyacetals, polyolefins, polyamides, polyesters, polyvinyls, and the like. The preferred materials for this use are the styrene polymers and copolymers because of their availability, strength, inexpensiveness, and foaming characteristics.

Blowing agents which can be employed with the plastics of this invention are well known to the art. They include the aliphatic hydrocarbons, such as pentane, butane, hexane, etc., the fluorocarbons, such as dichlorodifluoromethane, chlorodifluoromethane, and the like; carbon dioxide, ammonia, and various materials which upon being heated decompose to vapors.

It is not intended that this invention be limited to airplane wings or even to aircraft structures generally, since any type of large vehicular body construction can be made by the process of this invention. Doors and panels for buildings are contemplated within this invention. Wings, fins, stabilizers, ailerons, and all types of airfoils for airplanes, balloons, blimps, and space traveling missiles of all sorts are contemplated within the scope of this invention.

It is intended that this invention should not be limited in any fashion other than that indicated in the appended claims.

Having thus described the invention, what is claimed is:

1. A structural section for a vehicle comprising a lightweight, hollow, tubular, load-supporting skeleton comprising one or more principal members and one or more lateral members branching from said principal member in such a fashion that the internal hollow portion of each lateral member is joined to the internal hollow portion of at least one of said principal members substantially every member of said skeleton being pierced with a multiplicity of small orifices forming a multidirectional pattern of holes over the surface of said skeleton, an outer smooth skin spaced apart from said skeleton and providing the outer configuration of said structural section, and a rigid, cellular, plastic foam filling the space between said skeleton and said skin.

2. The structural section of claim 1 in which said skeleton comprises a lightweight metal tubing and said plastic foam is polystyrene foam.

3. The structural section of claim 1 which is an airfoil.

References Cited by the Examiner

UNITED STATES PATENTS 3,081,488  3/1963  Casavina et al. _____ 264—50
3,229,935  1/1966  Bellanca _____ 244—123

MILTON BUCHLER, *Primary Examiner.*

ALFRED E. CORRIGAN, *Examiner.*